United States Patent [19]

Dassanayake

[11] Patent Number: 5,475,571
[45] Date of Patent: Dec. 12, 1995

[54] RING LIGHT COLLECTOR

[75] Inventor: Mahendra Dassanayake, Farmington Hills, Mich.

[73] Assignee: Ford Motor Company, Dearborn, Mich.

[21] Appl. No.: 221,316

[22] Filed: Mar. 30, 1994

[51] Int. Cl.⁶ .......................................................... E21V 7/04
[52] U.S. Cl. ..................... 362/32; 362/26; 385/901
[58] Field of Search ................................... 362/32, 26, 61,
362/80; 385/901

[56] References Cited

U.S. PATENT DOCUMENTS

| | | | |
|---|---|---|---|
| 3,278,739 | 10/1966 | Royka et al. | 362/32 |
| 3,638,008 | 1/1972 | Keller et al. | 362/32 |
| 3,786,243 | 1/1974 | Elzig et al. | 362/32 |
| 4,735,495 | 4/1988 | Henkes | 362/32 X |
| 4,883,333 | 11/1989 | Yanez | 362/32 X |
| 4,897,771 | 1/1990 | Parker | 362/32 X |
| 5,184,883 | 2/1993 | Finch et al. | 362/32 |
| 5,222,793 | 6/1993 | Davenport et al. | 362/32 |
| 5,317,484 | 5/1994 | Davenport et al. | 362/32 |
| 5,321,586 | 6/1994 | Hege et al. | 362/32 |

*Primary Examiner*—Stephen F. Husar
*Attorney, Agent, or Firm*—Kevin G. Mierzwa; Roger L. May

[57] ABSTRACT

A ring light collector having a light source with a plurality of light pipes is located in a fixed relation with the light source. Each light pipe has a face which collectively substantially form a ring having a predetermined width between an inner diameter and an outer diameter. A concave reflecting surface having an axis of symmetry is fixed relative to the light source and plurality of light pipes. The concave reflecting surface extends in a rotated ellipsoidal fashion and is defined by the outermost surface of an ellipsoid having a major axis forming a predetermined angle with the axis of symmetry. The major axis of the ellipsoid is rotated about the axis of symmetry. The first focal point of the ellipsoid is located a predetermined distance from said axis of symmetry and a second focal point is located substantially between the outer diameter and inner diameter of the ring. The light source is located substantially at the first focal point. The light reflected from the concave reflecting surface forms a ring on the faces of the light pipes.

20 Claims, 2 Drawing Sheets

RING LIGHT COLLECTOR

BACKGROUND OF THE INVENTION

The invention relates generally to a light collector and more specifically a light collector for coupling light from a light source into a bundle of light pipes.

Elliptical light collectors are generally known for reflecting light from a light source into a light pipe. In general, an ellipse forms the reflecting surface. A light source is placed at one focus of an ellipse and light pipes are placed at the other focus of the ellipse. One disadvantage in such a system is that all the light generated from the light source falls on a single point or a small concentrated area. The region on which concentrated light falls is subject to a build up of heat. Over time, the heat generated can cause deformation and discoloration of the light pipes and lower the efficiency of the light collector.

One example of a modified elliptical collector is described in one embodiment (FIG. 2 (a)) of U.S. Pat. No. 5,222,793. There, a portion of two elliptical reflectors are joined together. The light is concentrated into two focal points, one from each half collector. It is believed that heat concentration divided in two portions is still too intense for many applications.

It would therefore be desirable to provide a light collector for collecting light in several light pipes while maintaining low heat distribution on the face of the light pipes.

SUMMARY OF THE INVENTION

One object of the present invention is to provide a light collector in which light is reflected from the collector in a wide area to wide distribute heat preventing damaging heat build-up on the area of light distribution.

The present invention advantageously achieves this object by providing a light collector having a light source with a plurality of light pipes located in a fixed relation with the light source. Each light pipe has a face which collectively substantially form a ring having a predetermined width between an inner diameter and an outer diameter. A concave reflecting surface having an axis of symmetry is fixed relative to the light source and plurality of light pipes. The concave reflecting surface extends in a rotated ellipsoidal fashion and is defined by the outermost surface of an ellipsoid having a major axis forming a predetermined angle with the axis of symmetry. The major axis of the ellipsoid is rotated about the axis of symmetry. The first focal point of the ellipsoid is located a predetermined distance from said axis of symmetry and a second focal point is located substantially between the outer diameter and inner diameter of the ring. The light source is located substantially at the first focal point. The light reflected from the concave reflecting surface forms a ring on the faces of the light pipes.

DETAILED DESCRIPTION OF THE PREFERRED EMBODIMENT

Figure 1:
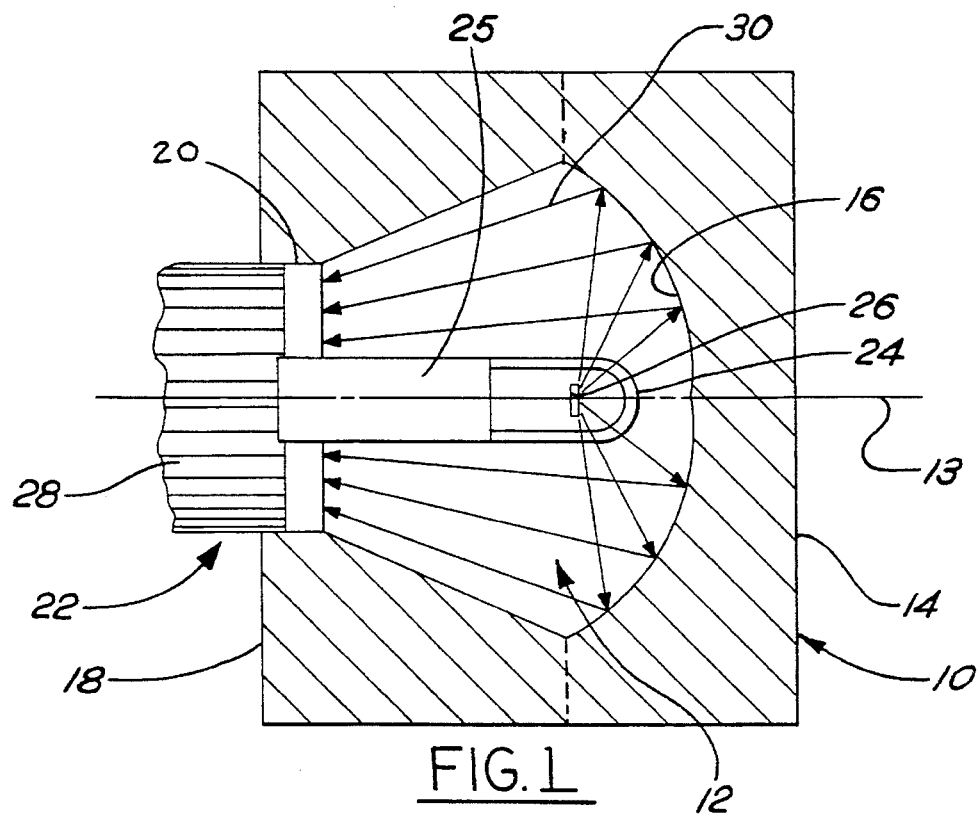
FIG. 1 is a diagrammatic cross sectional view of the light collector according to the preferred embodiment of the present invention.

Referring now to FIG. 1, a housing 10 generally encloses a chamber 12 having an axis of symmetry 13. Housing 10 is preferably divided into two portions and is made of a plastic material such as a thermoset or thermoplastic to facilitate manufacturability. The first portion is a reflector portion 14 for reflecting light rays 30 having a reflecting surface 16 made of aluminum or other suitable reflecting material commonly known in the art. The geometry of reflecting surface 16 will further be described in conjunction with FIG. 4 below.

The second portion of housing 10 is a securing portion 18 which has an aperture 20 located opposite reflecting surface 16. Securing portion 18 is fixedly connected to reflector portion by means of a glue, screws or other fastening means (not shown).

An aperture 20 is formed the securing portion 18 and is sized to receive a light ring assembly 22 which comprises a series of light pipes 28 disposed around light bulb 24. Light pipes 28 are made of a common light conducting material such as plastic or glass.

Light bulb 24 projects from a longitudinally extending base 25 which is preferably circular in cross section and is aligned parallel to and preferably collinearly with the axis of symmetry 13 and is centrally located in light bulb 24. One example of such a light bulb is a General Electric GE-882X-GC. Light bulb 24 is preferably removable from base 25. Light bulb 24 has a filament 26 which is preferably oriented in a direction perpendicular to axis of symmetry 13. Filament 26 has a region of increased intensity which is a known characteristic of light bulb 24. For example, in the GE bulb described above the midpoint of one half of filament 26 provides this more intense region of light emission. This region on the above described bulb is 1 mm from the midpoint of the length filament 26.

Figure 2:
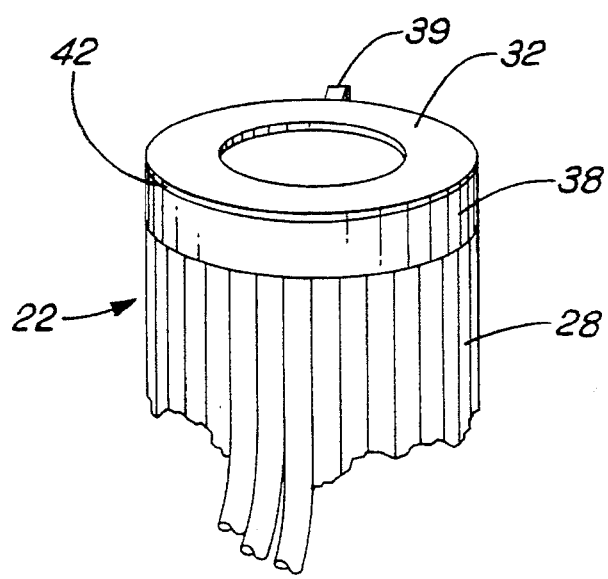
FIG. 2 is a perspective view of a light pipe bundle according to the preferred embodiment of the present invention.
Figure 3:
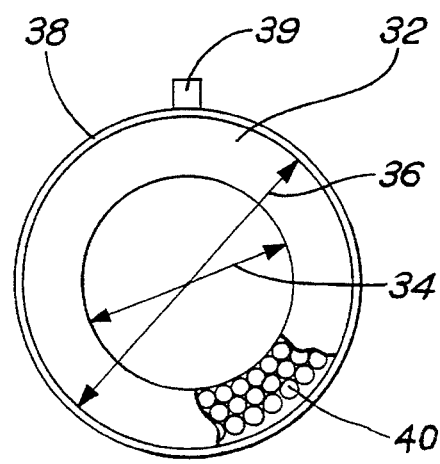
FIG. 3 is a top view of the ring area formed by the combination of the light pipe faces.

Referring now to FIGS. 2 and 3, light assembly 22 is comprised of a series of light pipes 28 arranged in a ring 32 which has an inner diameter 34 and a outer diameter 36. Light assembly 22 is removably carried within aperture 20 for servicing light bulb 24. Inner diameter 34 of ring 32 is formed around base 25. A retainer 38 defines outer diameter 36 of light assembly 22. Retainer 38 is preferably a plastic ring used to hold light pipes 28 and base 25 together. Retainer 38 has a key 39 which mates with a groove (not shown) in aperture 20 to ensure proper orientation and depth of the bulb 24 within aperture 20.

The area of ring 32 is derived from the specific application. For example, if light is needed in eight locations, eight light pipe bundles would be used. A typical light pipe bundle has approximately 8 to 12 individual light pipes. The ends of the light pipe bundles are unbundled and the individual light pipes 28 are secured around lamp base 25 with retainer 38. Each light pipe 28 has a face 40 which is preferably cut to form a generally planar surface when bundled together around base 25 in the ring shape.

Faces 40 can be covered by a filter 42 which will change the color of lights received into light pipes 28 and consequently the light emanated from light pipes 28.

Figure 4:
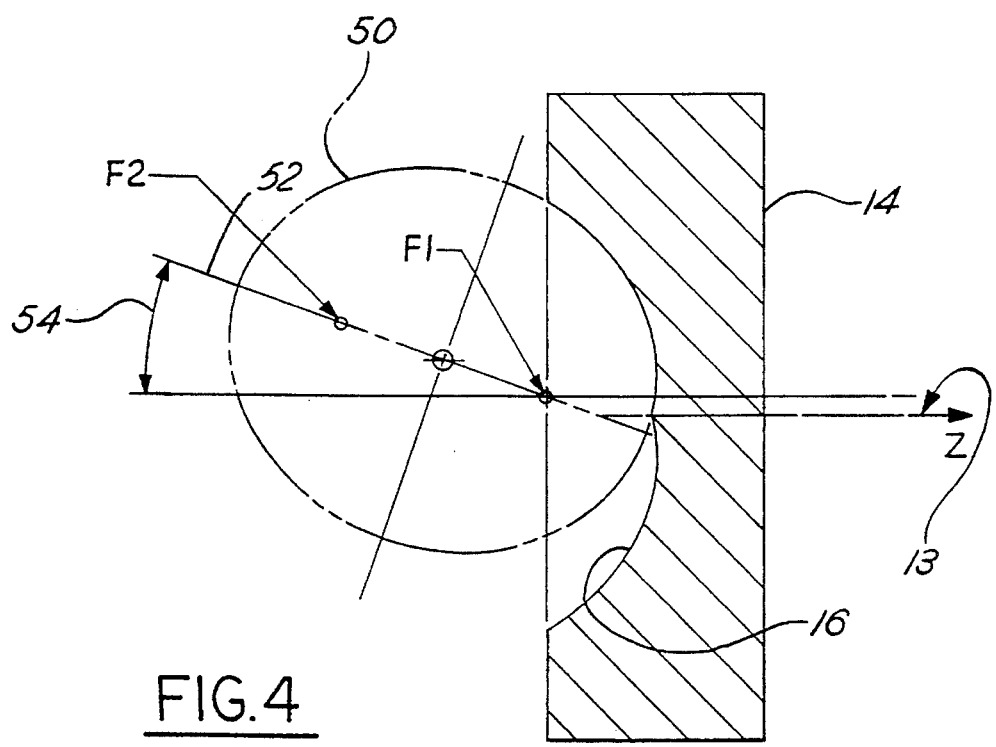
FIG. 4 is a section of a portion of the housing and the ellipse illustrative of the construction of the reflective surface.

Referring now to FIG. 4, reflective surface 16 is a generally concave region in reflector portion 14 of housing 10. Generally speaking, the reflective surface is formed by rotating an ellipsoid (represented in two-dimensional form by ellipse 50) about axis of symmetry 13. Ellipse 50 has a major axis 52, a first focal point F1 and a second focal point F2. First focal point F1 preferably lies a predetermined distance from axis of symmetry 13. Major axis 52 is elevated at an angle 54 from a line parallel to axis of symmetry 13 with first focal point F1 as the vertex of angle 54. When the major axis 52 of ellipse 50 is rotated about the axis of symmetry, first focal point F1 and second focal point F2 circumscribe a circle around axis of symmetry 13. Angle 54 is determined so that the locus of second focal point F2 points generally lies between outer diameter 36 and inner diameter 34. Angle 54 is a constant when focal points F1 and F2 circumscribe a circle about axis of symmetry 13. Preferably, the circle of second focal points F2 lies at the midpoint between outer diameter 36 and inner diameter 34. As an alternative to the above-described embodiment, the major axis 52 can be rotated in an elliptical pattern, i.e., not a constant angle, around axis of symmetry 13 so that focal points F1 and F2 circumscribe an ellipse.

The location of first focal point F1 in relation to the axis of symmetry 13 will determine the width of the reflected ring. The further the focal point F1 is away from axis of symmetry, the wider the beam pattern is on ring 32. The distance F1 should be placed from axis of rotation is determined by the direct angular relation corresponding to the width of ring 32. For example, if outer diameter 36 is 18 mm and inner diameter 34 is 10 mm, ring 32 would have a 4 mm wide thickness. Angle 54 would be a constant 0.29° if the brightest portion of filament is 1 mm from the axis of symmetry 13 and the distance between first focal point F1 and second focal point F2 is 21.190 mm. As a result, the light generated by light bulb 24 is reflected over a relatively large area, and consequently heat is also broadcast over a relatively large area. For interior lighting applications in an interior of an automotive vehicle, the flux density upon the faces of light pipes 28 should be no less than about 0.5–0.6 lumens/mm$^2$.

Figure 5:
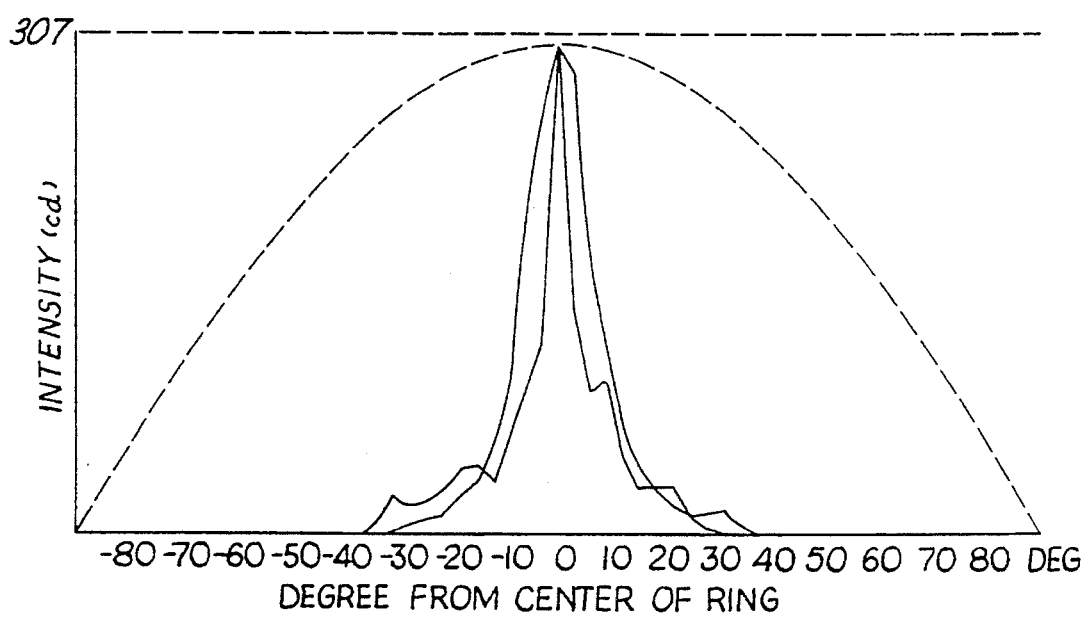
FIG. 5 is a polar plot of the distribution of light over two cross sections of the ring of light.

Referring now to FIG. 5, a polar plot shows the light distribution at two locations on the ring 32. Light when distributed in the ring shape is distributed over a wide area providing for less light and consequently less heat concentration at any one point as compared to the prior art. For example, the peak light intensity shown is 307 cd., which is several times less than if the light were concentrated at one or two points. This corresponds to a flux density of 0.5 or 0.6 lumens per square millimeter. The center of the polar plot represents the center of the width of ring 32 where reflective surface 16 is focused. As the radial degree from the center of the width of ring 32 increases the light falling on the faces of light pipes 28 decreases. This spread of light corresponds to the distance first focal point F1 is from the axis of symmetry 13. If the focal point of ellipse 50 where moved further from axis of symmetry 13, the spread of light around focal point F2 would be greater. If the focal point of ellipse 50 where moved to the axis of symmetry 13, light would be more concentrated at a circle containing all the second focal points F2. As shown in this configuration, the light is distributed over a large area and localized heating of individual light pipes is avoided.

Various modifications and applications of the novel light collector will be apparent to those skilled in the art. For example, changes may be made to the geometry of the light collector. All such modifications would be within the scope of this invention.

What is claimed is:

1. Light collector comprising:

a light source;

a plurality of light pipes located in a fixed relation with said light source, each light pipe having a face, said faces collectively substantially forming a ring having a predetermined width between an inner diameter and an outer diameter; and a concave reflecting surface fixed relative to said light source and said plurality of light pipes and having an axis of symmetry, said concave reflecting surface extending in a rotated ellipsoidal fashion defined by the outermost surface of an ellipsoid having a major axis forming a predetermined angle with said axis of symmetry, a first focal point located a predetermined distance from said axis of symmetry and a second focal point located substantially between the outer diameter and inner diameter of said ring, said major axis of said ellipsoid rotated about said axis of symmetry, said light source located substantially at said first focal point;

whereby light reflected from said concave reflecting surface forms a ring on said faces of said light pipes.

2. A light collector as recited in claim 1 wherein said faces of said light pipe form a substantially planar surface.

3. A light collector as recited in claim 2 wherein said light source has a base located in a predetermined position to said housing, said base having a longitudinal axis collinear with said longitudinal axis of said light source, said light source positioned on a line normal to the center point of said ring.

4. A light collector as recited in claim 1 wherein said light pipes are located around said base of said light source, said base having an outer diameter, said ring having an inner diameter which is substantially the outer diameter of said base.

5. A light collector as recited in claim 1 wherein said predetermined distance between said axis of symmetry and said first focal point is substantially zero.

6. A light collector as recited in claim 1 wherein said predetermined angle between said axis of symmetry and said major axis of said ellipsoid is constant so that when said ellipsoid is rotated about said axis of symmetry said first focal point circumscribes a circle about said axis of symmetry.

7. A light collector as recited in claim 1 wherein said predetermined angle between said axis of symmetry and said major axis of said ellipsoid varies so that when said ellipsoid is rotated about said axis, said first focal point circumscribes an ellipse about said axis of symmetry.

8. A light collector as recited in claim 1 wherein said predetermined distance between said plurality of first focal points and said axis of symmetry is a constant whereby when said first focus is rotated about said axis if symmetry it forms a circle and said light source is located at substantially a point on said circle.

9. A light collector as recited in claim 1 wherein said light source comprises a filament located perpendicular to said axis of symmetry.

10. A light collector as recited in claim 9 wherein said filament has a portion of increased intensity, said first focus of said ellipsoid located at portion of increased intensity.

11. A light collector as recited in claim 1 wherein each face has a predetermined acceptance angle, said concave surface extends to a point where the acceptance angle and said concave surface intersect.

12. A light collector as recited in claim 1 further comprising a light filter placed on said faces of said light pipe so that light incident on said faces of said light pipe will take on a predetermined color.

13. Light collector comprising:

a light source;

a plurality of light pipes located in a fixed relation with said light source, each light pipe having a face, said faces in combination substantially forming a ring having a predetermined width between an inner diameter and an outer diameter;

a housing having an interior and exterior portion and having an aperture adapted to receive said light pipes and said light source in a predetermined relation;

said interior portion having a concave reflecting surface, said concave reflecting surface fixed relative to said light source and said plurality of said light pipes having an axis of symmetry, said surface defined by the outermost surface of an ellipsoid, having a major axis forming a predetermined angle with said axis of symmetry, a first focal point located a predetermined distance from said axis of symmetry and a second focus point located substantially between the outer diameter and inner diameter of said ring, said major axis of said ellipsoid rotated about said axis of symmetry, said light source located substantially at said first focal point;

whereby light reflected from said concave reflecting surface forms a ring on said faces of said light pipes.

14. A light collector as recited in claim 13 wherein said faces of said light pipe form a substantially planar surface.

15. A light collector as recited in claim 14 wherein said light source has a base located in a predetermined position to said housing, said base having a longitudinal axis collinear with said longitudinal axis of said light source, said light source positioned on a line normal to the center point of said ring.

16. A light collector as recited in claim 13 wherein said predetermined angle between said axis of symmetry and said major axis of said ellipsoid is constant so that when said ellipsoid is rotated about said axis of symmetry said first focal point circumscribes a circle about said axis of symmetry.

17. A light collector as recited in claim 13 wherein said predetermined angle between said axis of symmetry and said major axis of said ellipsoid varies so that when said ellipsoid is rotated about said axis, said first focal point circumscribes an ellipse about said axis of symmetry.

18. Light collector comprising:

a light source having a longitudinal base;

a plurality of light pipes located around said base in a predetermined relationship to said light source, each light pipe having a face, said faces in combination substantially forming a planar ring having a predetermined width between an inner diameter and an outer diameter;

a first housing member having an interior and exterior portion;

a second housing member having an aperture adapted to receive said light pipes and said light source, said second housing adapted to be connected to said first housing;

a second housing member adapted to be connected to said first housing, said second housing having exterior and an interior concave reflecting surface, said concave reflecting surface fixed relative to said light source and said plurality of light pipes and having an axis of symmetry, said concave reflecting surface extending in a rotated ellipsoidal fashion defined by the outermost surface of an ellipsoid having a major axis forming a predetermined angle with said axis of symmetry, a first focal point located a predetermined distance from said axis of symmetry and a second focal point located substantially between the outer diameter and inner diameter of said ring, said major axis of said ellipsoid rotated about said axis of symmetry, said light source located substantially at said first focal point;

whereby light reflected from said concave reflecting surface forms a ring on said faces of said light pipes.

19. A light collector as recited in claim 18 wherein said predetermined angle between said axis of symmetry and said major axis of said ellipsoid is constant so that when said ellipsoid is rotated about said axis of symmetry said first focal point circumscribes a circle about said axis of symmetry.

20. A light collector as recited in claim 18 wherein said predetermined angle between said axis of symmetry and said major axis of said ellipsoid varies so that when said ellipsoid is rotated about said axis, said first focal point circumscribes an ellipse about said axis of symmetry.

* * * * *